United States Patent [19]

Pitt

[11] 4,374,693

[45] Feb. 22, 1983

[54] METHOD OF MANUFACTURING ATMOSPHERIC RESISTANT DOORS

[76] Inventor: William V. Pitt, P.O. Box 7622, Waco, Tex. 76710

[21] Appl. No.: 259,355

[22] Filed: Apr. 30, 1981

Related U.S. Application Data

[60] Division of Ser. No. 791,426, Apr. 27, 1977, Pat. No. 4,281,493, which is a continuation of Ser. No. 623,094, Oct. 16, 1975, Pat. No. 4,068,431.

[51] Int. Cl.$^3$ .......................... B32B 31/18; E06B 5/00

[52] U.S. Cl. ................................ 156/267; 49/DIG. 2; 52/309.11; 52/309.13; 52/809; 156/280; 156/292; 428/45; 428/76; 428/309.9; 428/68; 428/71

[58] Field of Search .................. 49/DIG. 2; 52/309.4, 52/309.7, 309.9, 309.11, 309.13, 806, 809; 156/267, 290, 292; 264/45.5, 46.5; 428/45, 68, 71, 76, 309.9, 304.4; 156/278, 280

[56] References Cited

U.S. PATENT DOCUMENTS

| | | | |
|---|---|---|---|
| 2,278,956 | 4/1942 | Wagner | 52/206 |
| 2,731,682 | 1/1956 | Evans | 52/406 |
| 3,080,268 | 3/1963 | Bjork | 428/188 |
| 3,299,595 | 1/1967 | Munk | 52/309.13 |
| 3,364,645 | 1/1968 | Wenzelberger | 52/809 |
| 3,397,496 | 8/1968 | Sohns | 52/286 |
| 3,402,520 | 9/1968 | Lee | 52/316 |
| 3,403,488 | 10/1968 | Davidson | 52/204 |
| 3,538,664 | 11/1970 | Frandsen | 52/309.13 |
| 3,546,841 | 12/1970 | Smith | 428/71 |
| 3,598,686 | 8/1971 | Clark | 428/68 |
| 3,775,240 | 11/1973 | Harvey | 52/206 |
| 3,895,159 | 7/1975 | Yoshimura | 428/227 |

FOREIGN PATENT DOCUMENTS 1332551 10/1973 United Kingdom .

*Primary Examiner*—Robert A. Dawson

*Attorney, Agent, or Firm*—Diller, Ramik & Wight

[57] ABSTRACT

This disclosure relates to a door which is resistant to hostile environments, such as corrosive chemicals, high humidity, etc., and includes a one-piece stile and rail fiberglass and resin reinforced collar, the collar being of an inwardly opening generally U-shaped configuration, the U-shaped collar being defined by a bight portion and opposite faces, and a fiberglass resin reinforced plate secured to the exterior of each of the faces. In keeping with the method of this invention the collar is internally reinforced, afterwards it is sandwiched between the plates, the three components are then bonded to each other, each plate is trimmed to the peripheral outline of the collar, and the trimmed edges of the plates are then coated with a polyester resin.

10 Claims, 13 Drawing Figures

FIG.6
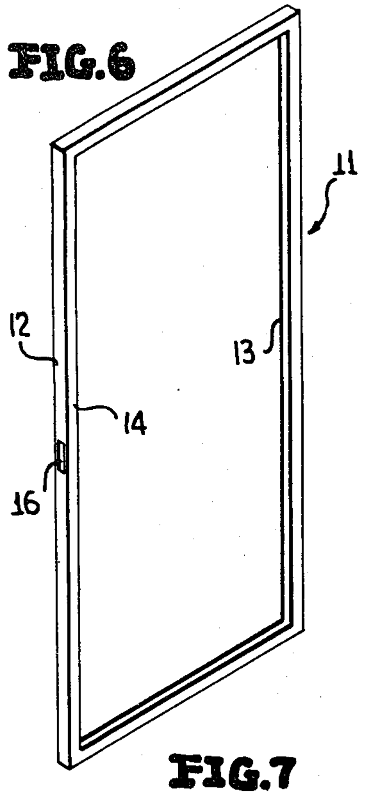
FIG.5
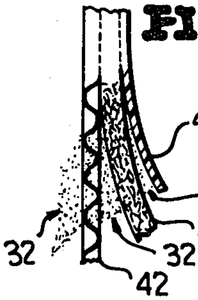
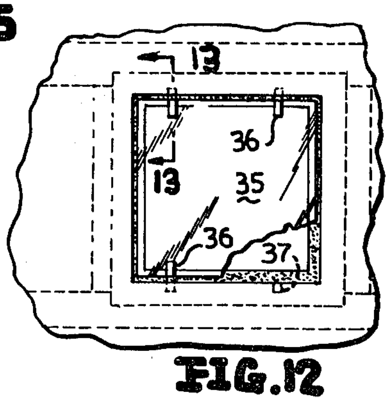
FIG.12
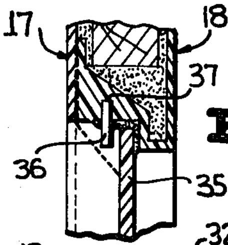
FIG.13
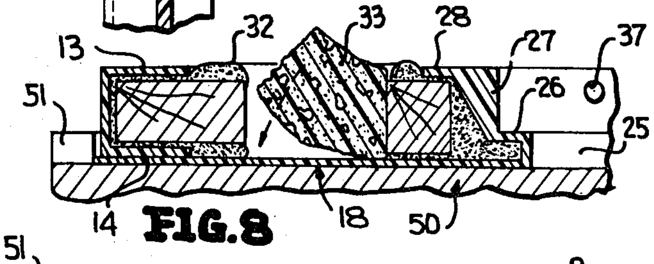
FIG.8
FIG.7
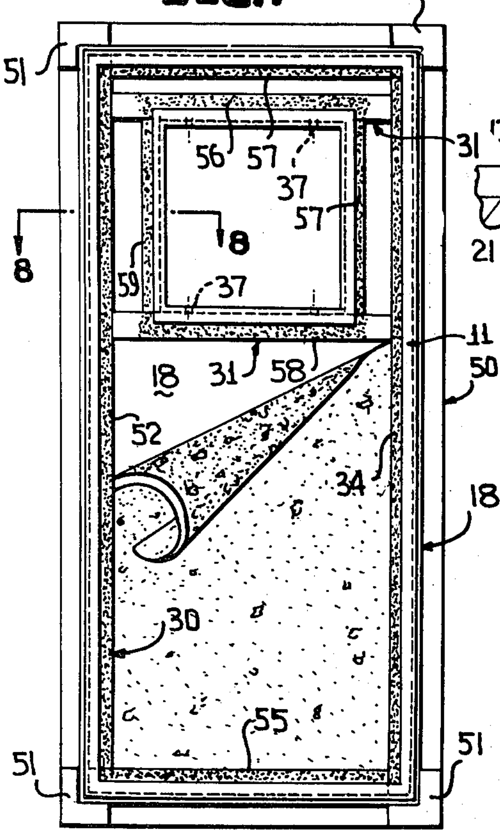
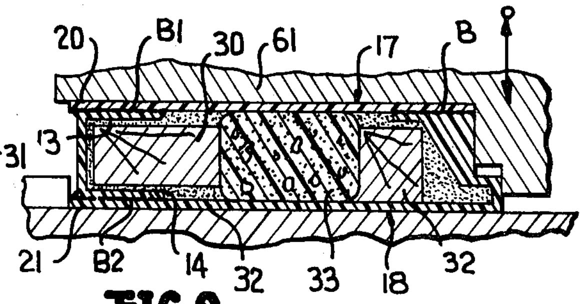
FIG.9
FIG.10
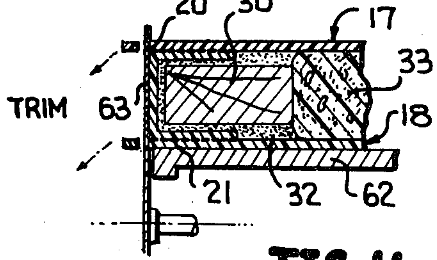
FIG.11
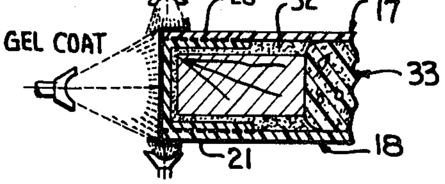

METHOD OF MANUFACTURING ATMOSPHERIC RESISTANT DOORS

This is a division of application Ser. No. 791,426 filed Apr. 27, 1977, now U.S. Pat. No. 4,281,493, which is a continuation of Ser. No. 623,094 filed Oct. 16, 1975 which is now U.S. Pat. No. 4,068,431.

Conventional doors are generally acceptable for interior use under "normal" conditions of atmosphere and environment. However, such doors are generally unacceptable under "abnormal" conditions as, for example, in poultry, meat, and like processing plants, certain hospital areas, laboratories, chemical and petro chemical plants, munition plants, food handling areas, etc. The latter involve problems which remain unresolved by conventional doors. For example, in poultry, meat, and like food processing plants certain areas are subject to high humidity or high moisture concentration, and in the past this has caused such problems as door delamination, cracking, finish chipping, etc. Such cracks or crevices permit the collection of germs which is totally undesirable for proper sanitation. Likewise, conventional doors are generally constructed such that they are not resistant to the corrosive effect of certain chemicals, among which might be listed ammonium hydroxide, hydrochloric acid, etc. Furthermore, conventional doors generally do not provide the necessary homogeneous surface finish and low surface porosity for hospital and laboratory applications to reduce or minimize germ collection.

In keeping with the foregoing it is a primary object of this invention to provide a novel door or like structure which reduces and/or eliminates the problems heretofore mentioned and unresolved by conventional doors, and specifically to provide a novel door construction which is resistive to chemical attack, is resistive to high moisture environments, has a relatively impermeable homogeneous surface finish and low surface porosity.

The latter objects are achieved by constructing a door in accordance with this invention from a one-piece stile and rail collar of an inwardly opening generally U-shaped configuration defined by a bight portion and opposite faces, and securing a plate to the exterior of each of the faces thereby producing a door having but two peripheral seams which in keeping with a further aspect of this invention are totally over-coated so that the entire door is of a seamless construction thus being highly resistant to chemical attack and high humidity.

A further object of this invention is to provide a novel door of the type heretofore described wherein the plates and collar are constructed from fiberglass-resin material.

Yet another object of this invention is to provide a novel door of the type heretofore described wherein a first of the plates includes an inboard annular wall projecting toward a second of the plates, an opening in the second of the plates defined by an inboard margin, and the inboard margin being secured to the annular wall thereby forming a window of the door.

Still another object of this invention which is specifically in keeping with the last object is to likewise coat the seam between the inboard margin and the annular wall to construct any door having a window or light of a seamless construction.

Still another object of this invention is to provide a novel door of the type aforesaid which includes strips of reinforcing material within the collar, and in doors having lites, like reinforcing strips are provided.

In keeping with a novel method of this invention the door is constructed by providing a pair of fiberglass-resin plates, providing a one-piece stile and rail fiberglass-resin collar of an inwardly opening generally U-shaped configuration defined by a bight portion and opposite faces, sandwiching the collar between the plates and bonding one plate to each face.

In keeping with a further object of this invention each plate is trimmed abouts its outer periphery to the outline of the bight portion, and thereafter the trimmed edge of each plate, the bight portion, and exposed peripheral border surfaces of the plates are coated with a polyester resin to render the door seamless.

A further object of this invention particularly in regard to doors having lites is to construct one of the plates with a stepped inboard continuous wall, and seating and securing a window upon a step of the wall.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 5 is an exploded view of the encircled portion of FIG. 4, and illustrates the construction of one of the two plates which is equally applicable to the one-piece stile and rail collar.

FIG. 6 is a perspective view, and illustrates the one-piece stile and rail collar of the present invention.

FIG. 7 is a top plan view, and illustrates the manner in which the door of FIG. 1 is initially fabricated.

FIG. 8 is an enlarged fragmentary section view taken generally along line 8—8 of FIG. 7, and illustrates the manner in which sound-insulating material is positioned within open areas of the opposing plates of the door.

FIG. 9 is a fragmentary cross-sectional view similar to FIG. 8, and illustrates a second plate being placed atop the assembly of FIG. 7, and the application of pressure thereto during a bonding operation.

FIG. 10 is a fragmentary sectional view similar to FIG. 9, and illustrates the manner in which marginal edges of the two plates are trimmed to the general outline of the one-piece stile and rail collar.

FIG. 11 is a fragmentary sectional view similar to FIG. 10, and illustrates the manner in which the trimmed edges of the plates and a bight portion of the one-piece stile and rail collar are spray-coated.

FIG. 12 is a fragmentary plan view of the window area of the door, and illustrates the manner in which glazing pins are utilized to retain a glass or like sheet of material within the door opening.

FIG. 13 is an enlarged fragmentary sectional view taken generally along line 13—13 of FIG. 12, and more clearly illustrates details of the window pane and door assembly with the right-hand side of the figure being that side exposed to the most hostile environment.

Figure 1:
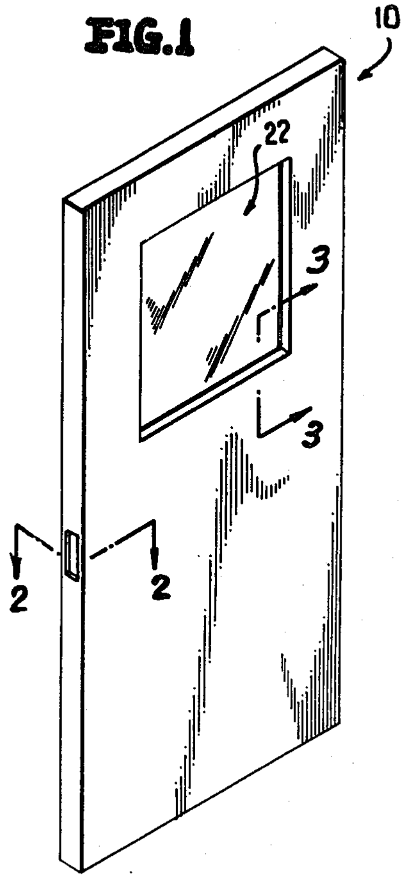
FIG. 1 is a perspective view of a novel door constructed in accordance with this invention, and illustrates a molded lite opening and mortis.
Figure 4:
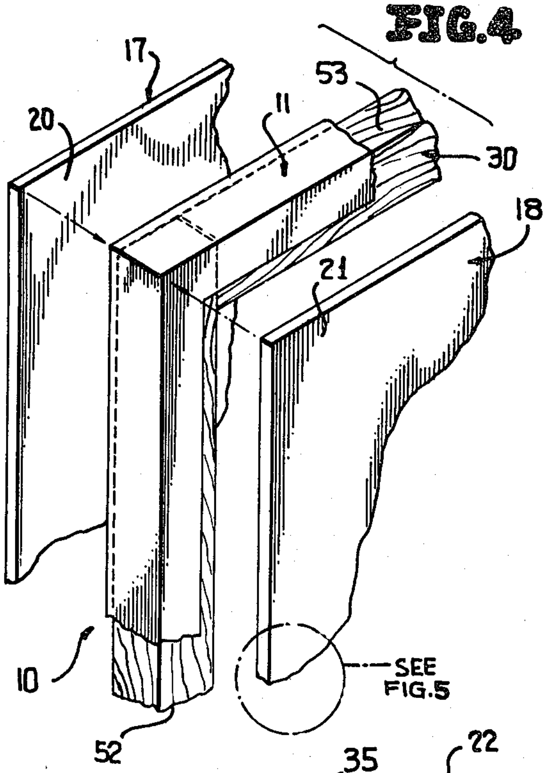
FIG. 4 is an enlarged fragmentary view, and illustrates the manner in which the one-piece stile and rail collar is provided internally thereof with strips of reinforcing material prior to being sandwiched between two plates.
Figure 2:
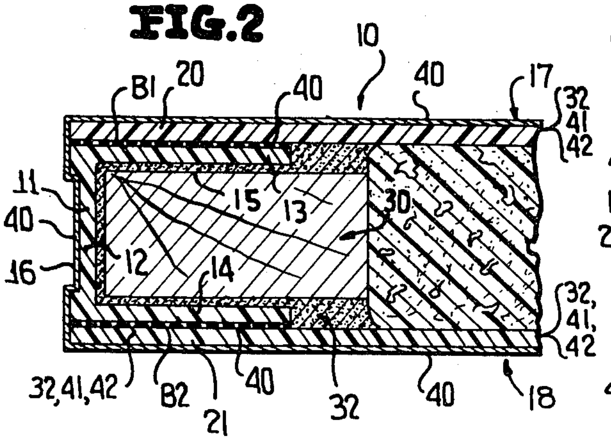
FIG. 2 is an enlarged sectional view taken generally along 2—2 of FIG. 1, and illustrates the cross-sectional configuration of the door including a one-piece stile and rail collar of an inwardly opening generally U-shaped configuration sandwiched between a pair of plates.

A novel door constructed in accordance with this invention is generally designated by the reference numeral 10 (FIG. 1) and includes a one-piece stile and rail collar 11 (FIG. 6) of an inwardly opening generally U-shaped configuration, as is best illustrated in FIG. 2. The stile and rail collar 11 is defined by a bight portion 12 (FIG. 2) and opposite generally parallel faces or legs 13, 14. The bight portion 12 and the legs or faces 13, 14 define a generally U-shaped channel 15 which opens inwardly, as is readily apparent from FIGS. 2, 4 and 6 of the drawings.

The bight portion 12 of the stile and rail collar 11 includes a generally rectangular mortise recess 16 (FIGS. 2 and 6).

A unique aspect of this invention is the manner in which the one-piece stile and rail collar is constructed from organic or inorganic materials such as polyester and epoxy remains reinforced by fiberglass fibers, flakes, mats, and/or rovings with external surfaces (unnumbered) of the bight portion 12 and the faces 13, 14 being coated with a polyester resin, such as "Gel-Kote", a product manufactured by the Glidden Company, Paint Division, 900 Union Commerce Building, Cleveland 14, Ohio. The specific manner in which the one-piece stile and rail collar is manufactured will be described hereinafter. However, it is pointed out that due to the latter-described components the bight portion 12 of the one-piece stile and rail collar 11 cannot be chiseled out in the usual manner of conventional doors and thus the mortis 16 is preferably formed during the molding operation of the stile and rail collar 11.

The door 10 further includes a pair of plates 17, 18 (FIGS. 2 and 4) of an identical construction to that of the one-piece stile and rail collar 11. The plates 17, 18 are of a generally rectangular configuration and correspond in outline to the overall outline of the stile and rail 11 except that the overall peripheral dimensions of the plates 17, 18 might be slightly larger than the overall exterior dimensions of the stile and rail 11 whereby marginal edge portions 20, 21 of the respective plates 17, 18 may initially project beyond the bight portion 12 of the stile and rail collar 11 and thus must be trimmed in a manner to be described more fully hereinafter.

Figure 3:
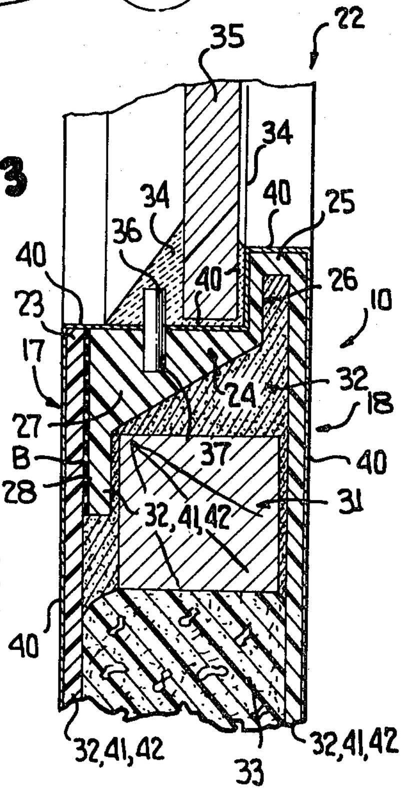
FIG. 3 is an enlarged fragmentary sectional view taken generally along line 3—3 of FIG. 1, and illustrates the manner in which one of the plates is provided with an integral continuous annular collar having a stepped portion upon which is seated a window.

The door 10 includes window means, generally designated by the reference numeral 22 (FIGS. 1 and 3) formed by providing an opening (unnumbered) in the plate 17, the opening being unnumbered but being defined by a generally rectangular inboard margin 23 of the plate 17 (FIG. 3). The plate 18 in turn includes a continuous annular wall, generally designated by the reference numeral 24 which projects toward the marginal portion 23 of the plate 17. The continuous annular wall 24 is also of a generally rectangular configuration, but the particular outline thereof may be varied as desired. The annular wall 24 is defined by a peripheral wall portion 25 (FIG. 3), a generally outwardly directed wall portion 26, another wall portion 27 projecting toward the marginal portion 23 of the plate 17, and a flange 27 again projecting in an outboard direction. During a bonding process to be described hereinafter an exterior surface (unnumbered) of the flange 27 is bonded over its entire surface to an interior surface of the marginal portion 23 of the plate 17 with the peripheral area of bond being generally designated by the reference character B in FIG. 3. The bonding area B is therefore a relatively wide area of bond which surrounds the entire window 22. Like bond areas B1 and B2 (FIG. 2) bond outer surfaces (unnumbered) of the faces 13, 14 of the one-piece stile and rail collar 11 to inner surfaces (unnumbered) of the plates 17 and 18 (FIG. 2).

Reinforcing means, generally designated by the reference numeral 30 (FIG. 2) are positioned within the channel 15 of the one-piece stile and rail collar 11, and like reinforcing means, generally designated by the reference numeral 31 (FIGS. 3 and 7) surround the window 22 and are positioned between the flange 28 and the opposing portion of the plate 18. Preferably a polyester resin 32 fills a substantial area of the door 10 about the internal periphery of the window 22 and the internal peripheral area adjacent the one-piece stile and rail collar 11. The resinous material 32 is reinforced by the fiberglass fibers, flakes, roving, etc. heretofore described, and though not illustrated in FIGS. 2 and 3, it is to be understood that the resinous material 23 also is disposed in the interstices of the fiberglass material of the plates 17, 18 and the stile and rail collar 11.

Sound dampening or deadening material 33 is also sandwiched between the plates 17 and 18.

Suitable bedding material 34 (FIG. 3) is disposed upon the portion 26 of the plate 18 and positioned thereupon is a piece of opaque, transparent, translucent or like material 35 afterwhich fiberglass glazing pins 36 (FIGS. 3 and 12) are inserted in openings 37 of the portion 27 of the annular wall 24. The bedding or glazing material 34 is then applied about the entire left-hand periphery of the pane 35 in the manner illustrated clearly in FIG. 3.

Before describing the manner in which the door 10 is constructed, reference is made to FIG. 5 which illustrates the manner in which the one-piece stile and rail 11 and each of the plates 17 and 18 is constructed. Reference numeral 40 indicates a polyester resin coating, such as the "Gel-Kote" heretofore described while reference numerals 41 and 42 designate random glass fibers and woven roving. Though not shown, it is to be understood that interspersed within the materials 41, 42 is organic or inorganic materials such as polyester or epoxy resins which are reinforced by the glass fibers 41 and the woven roving 42. Thus, each of the plates 17 and 18 from the exterior to the interior includes an outermost coating 40 of a polyester resin and inboard thereof the glass fibers 41 and the woven roving 42 which reinforces the resin material 32, which is illustrated in FIG. 5 as being disposed between the interior surface of the coating 40 throughout the fiberglass fibers 41 and the roving 42, and inboard of the latter. Comparing FIG. 5 with FIGS. 2 and 3, it is to be understood that each of the plates 17, 18 includes the polyester resin coating 40 coated atop the admixture of the resinous material 32, the fiberglass 41 and the roving 42. The one-piece integral stile and rail collar 11 is likewise of an identical construction having upon exterior surfaces of the faces 13, 14 and the bight portion 12 the coating of polyester resin 40 upon the innermost materials 32, 41, and 42.

Reference is now made to FIGS. 7 and 8 of the drawings which illustrates a jig 50 of a rectangular configuration having four locating means 51 at each corner thereof which generally locates the plate 18 thereupon. After the plate has been seated upon the jig 50 a coating of the resinous material 32 is applied to the bonding area B2 afterwhich the one-piece stile and rail collar 11 is seated upon the plate 18 with the face 14 seated upon the margin or marginal portion 21. Additional resinous material 32 is then applied to the interior of the channel 15 over the entire interior periphery of the one-piece stile and rail collar 11 as well as to the interior of the area between the flange 28 and the underlying portion of the plate 18, as is best shown in FIG. 3. Thereafter the reinforcing means 30, 31 are positioned respectively within the channel 15 and about the periphery of the window 22 in the area of the flange 28 and the underlying portion of the plate 18. The reinforcing means 30 may be, for example, strips of wood 52 through 55 while the reinforcing means 31 might also be strips of wood 56 through 59. After the reinforcing strips of material 52 through 59 have been placed in position in the manner illustrated in FIG. 7 additional resinous material 32 may be applied in the area thereof to assure bonding between the reinforcing means 30, 31, the plates 17, 18 and the one-piece integral stile and rail collar 11. During this same application of the additional resinous material 32 the same may be applied to the bonding surfaces B and B1 (FIGS. 2 and 3).

The sound deadening material 33 in the form of sound-deadening sheets of foam, such as polystyrene, are then positioned within the remaining open areas between, for example, the strips of material 52, 54, 55 and 58, in the manner clearly shown in FIG. 7. The remaining open areas between the strips 56, 57, 59 and the respective strips 53, 54 and 52 may likewise be filled with the sound deadening or dampening material 33. Thereafter the plate 17 is positioned atop the face 13 (FIG. 9) and a pressplate 61 (FIG. 9) is descended to maintain the components under pressure until the polyester or epoxy resin has rigidified to form the bonds B, B1 and B2.

After the plates 17, 18 have been bonded to the faces 13, 14 (FIG. 2) at the respective bond areas B1, B2 and the flange 28 has been bonded to the marginal portion 23 of the plate 17 at the bond area B (FIG. 3) the door 10 is removed from between the jig 50 and the plate 61 and transferred to a suitable support 62 (FIG. 10). A suitable rotating cutter or blade 63 is then utilized to trim the marginal portions 20, 21 of the plates 17, 18 which, as noted heretofore, may be of a peripheral outline differing from and generally larger than the bight portion 12 of the one-piece stile and rail collar 11. Due to the trimming operation the plates 17, 18 are now exposed about their entire edge periphery or, stated otherwise, the now trimmed edges (unnumbered) are unprotected by the polyester resin coating 40. Accordingly, the door 10 is next transferred to a coating station (FIG. 11) at which spray nozzles 63 are utilized to apply the polyester resin coating to the trimmed edges (unnumbered) of the plates 17, 18, as well as to the bight portion 12 of the one-piece stile and rail collar 11 which, of course, has a coating 40 thereupon, as well as to the exterior surfaces of the marginal portions 20, 21 which likewise have the coating 40 thereupon. However, this additional spray coating or otherwise applied coating of the polyester resin material 40 assures that the entire external periphery of the door 10 is completely seamless. Though not illustrated, the inboard marginal end portion 23 (FIG. 3) of the plate 17 is also spray coated or otherwise coated with the polyester resin material 40 so that the entire boundry of the window 22 is totally seamless, particularly in the area of the bond B.

Following the drawing of the latter-described coating material 40 the pane 35 is then inserted into the window 22 in the manner heretofore described. In regard to the latter, it is particularly important to note that the right-hand side of the door 10, as viewed in FIG. 3, is that side exposed to any hostile environment, and thus the door is totally seamless along the surface of the plate 18 exposed to the hostile environment, noting that all bonds B, B1 and B2 are to the left of the plate 18, as viewed in FIG. 3 and above the plate 18, as viewed in FIG. 2. Moreover, the openings 37 and the glazing pins 36 are also located to a side opposite the pane 35 which is exposed to the hostile environment. In this manner the coating 40 upon the plate 18, including the wall 25 thereof is totally uninterrupted and due to its construction from a polyester resin it presents a low surface porosity particularly relative to high moisture concentration environments. The coating 40 may, of course, be modified with fillers and other additives to approach the most desirable features deemed appropriate for any particular environment under consideration.

From the description of the door 10 heretofore setforth it is believed that the construction of the major components 11, 17 and 18 is readily apparent. However, the following is a preferred form of constructing the latter-components.

The plates 17, 18 are constructed identically by first applying a release agent, if thought necessary or desirable, to a rectangular plate somewhat larger to the overall outline of the plates 17, 18. Thereafter the polyester resin coating 40 is applied to this plate followed by a coating of the polyester resin material 32, the glass fibers 41, additional resinous material 32, the roving 42, and additional resinous material 32. Thereafter a second plate is laid atop this sandwiched construction and the sandwiched construction is placed under pressure until the resinous material 40, 32 has set or rigidified.

The stile and rail collar 11 is constructed identically as that of the plates 17, 18 except, of course, the particular configuration of the mold involved. The mold for forming the collar 11 includes two annular mold bodies, the first of which is of an L-shaped configuration as viewed in transverse cross-section having an interior surface corresponding to the exterior dimensions of the collar 11 and a second mold portion of a rectangular configuration which in conjunction with the L-shaped portion defines a U-shaped cavity corresponding to the exterior shape of the collar 11. The interior of the latter-cavity is coated with the polyester resin 40 afterwhich the interior is built-up in the manner heretofore described relative to FIG. 5 to form the bight portion 12 and the faces or legs 13, 14. Once the latter has been thus built-up an expandable and contractable female core may be inserted into the built-up collar 11 to apply pressure during the setting-up of the resinous material.

The mold portion which overlies the L-shaped mold portion also includes a depending core or plug corresponding to the exterior configuration of the walls 27, 26 and 25 of the window 22 to achieve the stepped configuration best shown in FIG. 3.

By virtue of the construction just described relative to the fabrication of the plates 17, 18 and the one-piece stile and rail collar 11, it is to be particularly noted that due to the construction of the latter (one-piece stile and rail collar 11) there is absolutely no seam exposed to the hostile environment (right-hand side of the door 10 of FIG. 3). Moreover, those seams that do exist are only three in number at the bond areas B, B1 and B2, but each is overcoated by the coating of polyester resin material 40. Moreover, any warpage which might otherwise occur due to changes in temperature and/or humidity are totally obviated or reduced to a maximum by the reinforcement offered the stile and rail collar 11 by the reinforcing means 30, as well as the reinforcement offered in the area of the window 22 by the reinforcing means 31.

Due to the material involved (FIG. 5) the mortis 16 cannot be chiseled out and thus is molded integrally during the molding of the integral stile and rail collar 11. Thus, even in this area there are no cracks or crevices which would catch or collect contaminants or germs. Thus, in the overall door 10 there is no perforation of the structure by screws, nails, bolts, retaining moldings, or the like which could be contaminant and/or germ collectors. Thus, the overall construction heretofore described permits the door to be totally capable of withstanding most any corrosive, high moisture content and other hostile environments.

While preferred forms and arrangement of parts have been shown in illustrating the invention, it is to be clearly understood that various changes in details and arrangement of parts may be made without departing from the scope and spirit of this disclosure.

I claim:

1. A method of making a door comprising the steps of providing a one-piece, integral, continuous, relatively thin walled stile and rail collar of a generally rectangular exterior outline formed of a completely cured admixture of unfoamed polymeric resin and reinforcing material resistant to corrosive and/or high humidity environments of an inwardly opening generally U-shaped cross-sectional configuration formed by a bight and opposite spaced generally parallel faces with interior and exterior surfaces thereof being devoid of exteriorly exposed reinforcing material; providing a pair of plates with each plate being of a generally rectangular outline as defined by terminal edges corresponding in size and shape to the rectangular outline of the collar and being formed of a completely cured admixture of polymeric resin and reinforcing materials resistant to corrosive and/or high humidity environments with an outer surface of each plate being devoid of exteriorly exposed reinforcing material; sandwiching the collar between the plates with all exterior surfaces of the collar and plates facing outwardly, utilizing a polymeric resin bonding material which is resistant to corrosive and/or high humidity environments for bonding the collar and plates together, and creating a generally flush relationship between the terminal edges of the plates and the collar bight exterior surface.

2. The method as defined in claim 1 including the step of over-coating the terminal edges and the collar bight exterior surface with polymeric resin material resistant to corrosive and/or high humidity environments.

3. The method as defined in claim 1 including the step of over-coating the plates outer surfaces with a coating of polymeric material resistant to corrosive and/or high humidity environments.

4. The method as defined in claim 1 including the step of over-coating the collar bight exterior surface with a coating of polymeric material resistant to corrosive and/or high humidity environments.

5. The method as defined in claim 1 including the step of over-coating the plates outer surfaces and the collar bight exterior surface with a coating of polymeric material resistant to corrosive and/or high humidity environments.

6. The method as defined in claim 1 including the step of trimming the plate edges generally flush with the collar bight exterior surface.

7. The method as defined in claim 1 including the step of trimming the plate edges generally flush with the collar bight exterior surface, and over-coating the trimmed edges of the plates with polymeric material resistant to corrosive and/or high humidity environments.

8. The method as defined in claim 7 including the step of over-coating the plates outer surfaces with a coating of polymeric material resistant to corrosive and/or high humidity environments.

9. The method as defined in claim 7 including the step of over-coating the collar bight exterior surface with a coating of polymeric material resistant to corrosive and/or high humidity environments.

10. The method as defined in claim 7 including the step of over-coating the plates outer surfaces and the collar bight exterior surface with a coating of polymeric material resistant to corrosive and/or high humidity environments.

* * * * *